United States Patent
Tzeng et al.

(10) Patent No.: US 9,181,100 B2
(45) Date of Patent: Nov. 10, 2015

(54) METHOD OF TRANSFERRING A GRAPHENE FILM

(75) Inventors: Yon-Hua Tzeng, Tainan (TW);
Wai-Leong Chen, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 55 days.

(21) Appl. No.: 13/534,129

(22) Filed: Jun. 27, 2012

(65) Prior Publication Data
US 2014/0001151 A1    Jan. 2, 2014

(51) Int. Cl.
*C03C 15/00* (2006.01)
*C01B 31/04* (2006.01)
*B82Y 30/00* (2011.01)
*B82Y 40/00* (2011.01)

(52) U.S. Cl.
CPC ............. *C01B 31/0484* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 2001/0015210 A1* | 8/2001 | Choi et al. | 134/1 |
| 2011/0117361 A1* | 5/2011 | Hamilton et al. | 428/333 |
| 2011/0311029 A1* | 12/2011 | Andersson | 378/161 |

OTHER PUBLICATIONS

Mutikainen et al, Large-area pressure-enduring entrance windows for soft x-ray regime. Jan 1, 1994, J Xray Sci Tecnol, Abstract.*

* cited by examiner

*Primary Examiner* — Binh X Tran
*Assistant Examiner* — David Cathey, Jr.
(74) *Attorney, Agent, or Firm* — Bacon & Thomas, PLLC

(57) ABSTRACT

The present invention relates to a method of transferring a graphene film comprising the steps of (A) providing a carrier, wherein the carrier has a first surface, and a second surface, and a first graphene film is formed on the first surface; (B) disposing a patterned protection layer on the second surface of the carrier; (C) patternin carrier with the first graphene film on a target substrate; (E) removing the the carrier to expose the first graphene film; (D) disposing the patterned carrier to transfer the first graphene film on the substrate.

17 Claims, 4 Drawing Sheets

METHOD OF TRANSFERRING A GRAPHENE FILM

BACKGROUND OF THE INVENTION

1. Field of the Invention

The present invention relates to a method for transferring a carbon film, including graphene, particularly relates to an efficient method for transferring a graphene film with low chemical and mechanical damages.

2. Description of Related Art

Carbon coatings ranging from $sp^3$-bonded diamond films, diamond-like films with mixed $sp^3$-bonding and $sp^2$-bonding, to $sp^2$-bonded graphene films and many others are of great interest and useful for many practical applications. Among them, the thinnest and most difficult to be handled or transferred from one substrate to the other is graphene films of only one atom or few atoms thick. Although the present invention relates to a method for transferring such a graphene film with low chemical and mechanical damage. The method is applicable to other carbon films including diamond films, diamond-like films, and other composite carbon films with or without metals of relevant dopants or additives.

The structure of a monolayer graphene film is formed by hexagonal rings of $sp^2$-bonded carbon atoms that are tightly packed into a two-dimensional honeycomb lattice. The general term of graphene includes one layer of monolayer graphene, multiple layers of monolayer graphene of different sizes stacking in a variety of stacking orders, and graphene structures with one or more layers of monolayer graphene deposited horizontally on a substrate or growing vertically from a substrate as a standing graphene.

Graphene has excellent optical, electronic, and mechanical properties, and is applicable to transparent conductive layers, conductive composites, or flexible electronics due to its transparent nature. Also, it may be applied in a capacitor, a lithium electrode, or a mechanical reinforced composite.

Many graphene products are formed by transferring graphene from where it is synthesized to a application substrate. Furthermore, some products require stacking a plurality of graphene films in a manner of layer-by-layer transferring. Currently, a preferable method for synthesizing a graphene film is the thermal chemical vapor deposition, wherein the graphene film is formed on a catalytic metal and then adhered with polymethylmethacrylate (PMMA). Therefore, using an etching process, the catalytic metal is separated from the graphene film adhered thereon, thereby transferring the graphene film onto PMMA. Next, a target substrate is laminated with the PMMA adhered with the graphene film, and then the PMMA is removed by heat, ultraviolet (UV) light, gas ($H_2$ and $N_2$), or acetone, to transfer the graphene film onto the target substrate, thus achieving transferring of the graphene film.

The above-mentioned method for transferring a graphene film may work efficiently. However, during the transferring of the graphene film from the catalytic metal to the target substrate, several chemical solution etching and mechanical impression processes are required, causing the graphene film to crack. Accordingly, it is desirable to develop a method for transferring a graphene film with efficiency, high yield, and low stress to exploit more applications of the graphene film.

SUMMARY OF THE INVENTION

The present invention provides a method for transferring a graphene film with low chemical and mechanical damage to improve the quality of graphene film transfer.

The present invention also provides a method for transferring a graphene film or for transferring a plurality of graphene films with high efficiency.

To achieve the above objects, the present invention provides a method for transferring a graphene film, comprising the following steps: (A) providing a carrier, wherein the carrier has a first surface and a second surface, and a first graphene film is formed on the first surface of the carrier; (B) disposing a patterned protection layer on the second surface of the carrier; (C) patterning the carrier to expose the first graphene film, wherein the pattern of the carrier corresponds to the patterned protection layer; (D) disposing the patterned carrier with the first graphene film on a target substrate; and (E) removing the patterned carrier to transfer the first graphene film onto the target substrate.

Of the present invention, the constituting material of the carrier may be a catalytic solid, including ceramics such as silicon, silicon dioxide, sapphire, and metals such as copper, nickel, iron, silver, or combinations thereof, and preferably copper, nickel, or combinations thereof. And the methods for producing graphene film from the carrier include thermal chemical vapor deposition, sputtering, or coating process, and preferably thermal chemical vapor deposition, so as to form the graphene film on a surface of the carrier, and any other surface of the carrier subject to the requirement. The thickness of the carrier for the graphene film is not particularly limited and is preferably 10-500 µm, and more preferably 50-200 µm. In addition, the method for forming the patterned protection layer is not particularly limited, for example, a selective etching process for patterning a coating which is resistant to the etchant used for etching the unprotected areas of the carrier, a process for directly writing or printing designed and patterned coatings of materials which are resistant to the etchants for etching the unprotected areas of the carrier, or preferably an adhesive tape or a plural of adhesive tape may be used to form a patterned protection layer.

In the step (C), the method for patterning the carrier is not particularly limited in variety, and a chemical or physical method, preferably a chemical method, and more preferably an etching process which etches the carrier but not the graphene, may be used for patterning the carrier. In the step (C), a chemical solution is employed for etching the carrier, wherein the chemical solution may be an ammonium persulfate solution, a ferric chloride solution, a phosphoric acid solution, a sulfuric acid solution, or combinations thereof, and preferably an ammonium persulfate solution.

The step (D) of the present invention may comprise the following steps: (D1) providing a suspension solution, wherein a target substrate is disposed therein; (D2) disposing the patterned carrier with the first graphene film in the suspension solution, wherein the patterned carrier suspends on the suspension solution; and (D3) removing the suspension solution. As such, after the first graphene film is adhered to the target substrate, the patterned carrier is removed to transfer the first graphene film onto the surface of the target substrate.

The transferring of a graphene film onto the target substrate in step (D) is performed by suspending the first graphene film having the patterned carrier on the suspension solution, and gradually removing the suspension solution such that the first graphene film gradually approaches to the surface of the target substrate on the suspension solution. After removing the suspension solution, the first graphene film having the patterned carrier can adhere to the surface of the target substrate. Finally, the patterned carrier is removed to complete the transferring of the first graphene film to the surface of the target substrate.

The graphene with tapes can be turned up-side-down with tape being on top of graphene to be transferred. It also can remain in the original orientation after etching of copper, i.e., the tape in below the graphene.

The graphene can be adhered (transferred) to a substrate by placing the substrate under the graphene and raising the substrate to lift the graphene off the solution.

The graphene can also be adhered (transferred) to a substrate, which is placed up side down, by putting the substrate facing down to touch the graphene from the air side of the floating graphene. Adhesion of the graphene to the substrate will allow it to be stick to the substrate and removed from the solution.

Alternatively, the step (D) may also include: (D1) providing a suspension solution, and disposing the patterned carrier with the first graphene film in the suspension solution, wherein the patterned carrier suspends on the suspension solution; (D2) lifting up the patterned carrier to scoop up the first graphene film from the suspension solution; and (D3) disposing the first graphene film on the target substrate. This method employs the patterned carrier as origin of force and the first graphene film may be lifted up from the suspension solution without touching the first graphene film, wherein the film may be lifted from bottom up. Next, the scooped-up first graphene film is adhered to the surface of the target substrate. In addition, after scooping up the first graphene film from the suspension solution, at least one surface of the first graphene film may further be subjected discretionarily to a surface treatment process, such as screen printing, spray coating, chemical vapor deposition, Atomic layer deposition, plasma treatment, oxygen plasma treatment, hydrogen plasma treatment, or metal sputtering etc. depending on requirements.

In the present method for transferring a graphene film, the step (A) may further comprise the following steps: (A1) providing a carrier and a carrier board, wherein a first graphene film and a second graphene film are formed respectively on the first surface and the second surface of the carrier, and a buffer layer is disposed on the surface of the carrier board; (A2) stacking the carrier on the carrier board, and the buffer layer, the first graphene film, the carrier, and the second graphene are stacked on the carrier board sequentially; (A3) removing the second graphene film to expose the second surface of the carrier.

The constituting material of the carrier board is a rigid material, for which the choice of material is not particularly limited, such as glass board, acrylic sheet, plastic board, ceramic board, and so on, and preferably glass board and acrylic sheet. In addition, the buffer layer has a property of being hard to adhere to the graphene film, and may be preferably paper, tissue paper, non-woven, or combinations thereof, and more preferably tissue paper.

In the above mentioned step (A) of the present invention, the first graphene film and the second graphene film are formed respectively on the first surface and the second surface of the carrier, wherein the method for removing the second graphene film includes: disposing the carrier having the graphene film formed thereon on the carrier board stacked with a buffer layer such that the buffer layer, the first graphene film, the carrier, and the second graphene are stacked on the carrier board sequentially. The first graphene film of the carrier contacts the buffer layer, and the second graphene film of the carrier is stacked on the topmost layer. As such, the second graphene film is exposed to surroundings for easy removal. The method for removing the second graphene film is not particularly limited, and it may be a chemical or a physical process, preferably a chemical process, and more preferably an etching process. The etching solution for removing the second graphene film may be a chemical solution for etching carbon, preferably a hydrogen peroxide solution, a nitric acid solution, a potassium hydroxide solution, or combinations thereof, and more preferably a mixture of a hydrogen peroxide solution and a nitric acid solution.

The method for transferring a graphene film may further comprise a step (A1') after the step (A1): cleaning the first graphene film and the second graphene film, wherein the step (A)' of cleaning the graphene films aims to wash away the chemical solution and impurities on the films such that the graphene films is more readily for the subsequent surface-treatment process or chemical reaction, such as plasma treatment, oxygen or hydrogen plasma treatment, metal sputtering, etching process, and so forth. The solution for cleaning the graphene film is not particularly limited to one choice as long as it can achieve the above object. Suitable solutions for cleaning the graphene film include solutions of: hydrochloric acid, sulfuric acid, acetic acid, or phosphoric acid, and preferably hydrochloric acid.

The step (B) may further comprise a step (B'): cleaning the second surface of the carrier, for which the purpose aims to prevent the chemical solution and impurities remaining on the second surface of the carrier from negatively affecting the following chemical reaction and surface treatment, such as etching reaction. The solution for cleaning the surface of the carrier is not particularly limited as long as the solution can achieve the above object. The solution for cleaning the surface of the carrier comprises solutions of: hydrochloric acid, sulfuric acid, acetic acid, or phosphoric acid, and preferably hydrochloric acid.

The step (C) of the present invention is patterning the carrier by various chemical reactions. In the present invention, the carrier with the first graphene film is disposed in an etching solution to pattern the carrier by etching process. After the carrier with the first graphene film is patterned, the carrier comprises: the patterned carrier and the first graphene film on the patterned protection layer.

In addition, following the step (C), it may further comprise a step (C'): surface-treating at least one surface of the first graphene film, wherein the surface-treatment comprises: plasma treatment, oxygen plasma treatment, hydrogen plasma treatment, metal sputtering, such as silver and platinum metal sputtering, painting of sulfur and sulfur compounds with binders, painting of graphite particles with binders.

The method for transferring a graphene film of the present invention may further comprise a step (F) after the step (E): repeating the steps (A)-(E), thus forming a plurality of graphene films on the target substrate.

In addition to transferring the graphene film using the patterned carrier, the present invention also provides a method for transferring a graphene film, comprising the following steps: (A) providing a carrier, wherein the carrier has a first surface and a second surface, and a first graphene film is formed on the first surface of the carrier; (B) disposing the carrier in a carrier-removing solution to remove the carrier, and the first graphene film suspends on the carrier-removing solution; (C) replacing the carrier-removing solution with a suspension solution, wherein the first graphene film suspends on the suspension solution; (D) separating the first graphene film from the suspension solution; and (E) transferring the first graphene film onto a target substrate.

Wherein the carrier-removing solution is a chemical solution for etching the carrier, and the chemical solution may be ammonium persulfate solution, a ferric chloride solution, a phosphoric acid solution, a sulfuric acid solution, or combinations thereof, and preferably an ammonium persulfate solution. The function of the suspension solution is preliminarily cleaning the remaining chemical solution on the carrier or the first graphene film, wherein the suspension solution may be a diluted carrier-removing solution, water, alcohol, acetone, or deionized water, and preferably deionized water.

The step (A) of the method for transferring a graphene film may further comprise the following steps: (A1) providing a carrier, wherein a first graphene film and a second graphene film are formed respectively on the first surface and the second surface of the carrier; and (A2) disposing the carrier on a graphene-removing solution, wherein the first graphene film is exposed to the surroundings, and the second graphene film contacts the graphene-removing solution to remove the second graphene film. In the step (A), a single graphene film of the carrier with the first and second graphene film is removed to obtain a carrier only with the first graphene film, wherein the graphene-removing solution is the same as the above-mentioned.

The method for transferring a graphene film may further comprise a step (A') before the step (B): forming a marker on the first graphene film; and wherein the step (D) may further comprise: disposing a target substrate into the suspension solution, and determining a relative position between the first graphene film and the target substrate by the marker. In an alternative embodiment of the present invention, the carrier is removed without a patterned protection layer, so that only the first graphene film remains after the carrier is removed. However, because the graphene film is transparent and difficult to be seen by naked eyes, a marker is formed on the first graphene film before etching the carrier such that the first graphene film can be seen by naked eyes after the carrier is removed. The method for marking the first graphene film is not particularly limited as long as the first graphene film is not damaged. For example, pen or ink may be used to mark the graphene film.

In an alternative embodiment, the step (D) of the method for transferring a graphene film may further comprise: (D1) disposing a target substrate in the suspension solution; and (D2) removing the suspension solution to transfer the first graphene film onto the target substrate. During removal of the suspension solution, the target substrate is used for transferring the first graphene film through the adhesion force therebetween. A method for removing the suspension solution may be through suspension solution separation. In addition to sucking, the first graphene film can be scooped up from the suspension solution to be transferred to the surface of the target substrate directly.

In an alternative embodiment, the step (D) of the method for transferring a graphene film may further comprise a step (D'): scooping the first graphene film from the suspension solution, and surface-treating the scooped first graphene film. The surface treatment process may be plasma treatment, oxygen plasma treatment, hydrogen plasma treatment, or metal sputtering etc. In an alternative embodiment, the carrier and the first graphene film may be further washed by a cleaning solution to wash away the chemical solution and impurities remaining on the first graphene film, such that the first graphene film is more readily available for a surface-treatment process or a chemical reaction. The cleaning solution is the same as the above-mentioned.

DETAILED DESCRIPTION OF THE PREFERRED EMBODIMENT

Figure 1A:
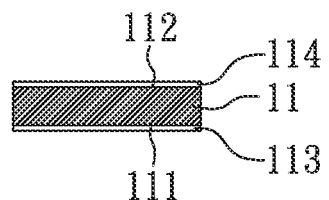
FIGS. 1A to 1H illustrate the schematic cross-sections of the different stages of the process for transferring the graphene film according to Example 1 of the present invention.

In the following description, numerous specific details are set forth to provide a thorough understanding of embodiments of the present disclosure. However, one having an ordinary skill in the art will recognize that embodiments of the disclosure can be practiced without these specific details. In some instances, well-known structures and processes are not described in detail to avoid unnecessarily obscuring embodiments of the present disclosure.

EXAMPLE 1

Please Refer to FIGS. 1A to 1H for an Embodiment of the Present Invention.

First, as shown in FIG. 1, a carrier 11 is provided, wherein the carrier is a copper carrier having a thickness of 25 μm. The carrier 11 has a first surface 111 and a second surface 112. Thermal chemical vapor deposition is performed to form a first graphene film 113 and a second graphene film 114 on the first surface 111 and the second surface 112 of the carrier 11 respectively.

Figure 1B:
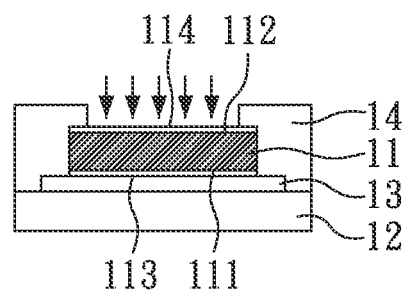

Then, as shown in FIG. 1B, a carrier board 12 is provided, wherein the carrier board is a glass board. A buffer layer 13 is disposed on the surface of the carrier board 12, wherein the buffer layer 13 is a dust-free paper. Then, the carrier 11 is disposed on the buffer layer 13 with the first graphene film 113 facing the buffer layer 13, such that the second graphene film of the carrier is exposed to the surroundings so as to protect the first graphene film 113 from corrosion of the subsequent chemical reaction. Next, a patterned protection layer 14 is disposed on the second graphene film 114. In this Example, the patterned protection layer 14 is adhered tightly to the peripheral of the second graphene film 114 by a tape, thus completing the disposition of the patterned protection layer 14. The object of the tight adhesion is to avoid penetration of the following chemical solution to corrode the first graphene film 113.

Then, the exposed second graphene film 114 is etched by an etching chemical solution for etching carbon to complete the etching process of the second graphene film 114, and the second surface 112 of the carrier 11 is thus exposed. The etching chemical solution for etching carbon used in this Example is a mixture of $H_2O_2$ and $HNO_3$.

Figure 1C:
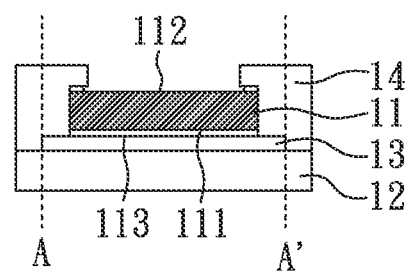
Figure 1D:
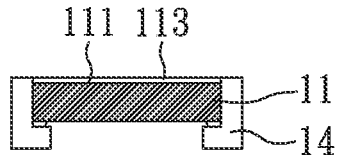

As shown in FIG. 1C, after the etching process for the second graphene film 114 is done, the carrier is cut along the line A-A' to separate the carrier 11, the carrier board 12, and the buffer layer 13, thus exposing the first graphene film 113 as shown in FIG. 1D.

Figure 1E:
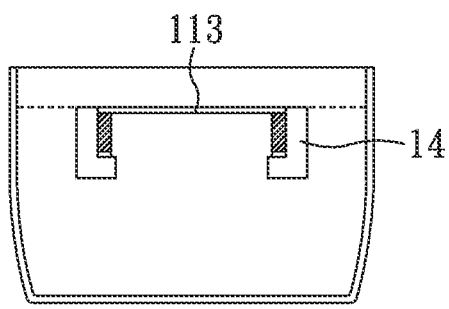

Next, as shown in FIG. 1E, the carrier 11 is dipped in a carrier-etching solution to remove the carrier 11 by chemical etching reaction to separate the first graphene film 113 from the carrier, and exposed to the first graphene film 113. The carrier-etching solution of this Example is 4% of the solution of $(NH_4)_2S_2O_8$. After the etching process of the carrier 11 is finished, only the patterned protection layer 14 and the patterned carrier 11 corresponding to the patterned protection layer remain on the first graphene film 113.

Then, the first graphene film 113 of the etched carrier 11 is dipped in deionized water for several times, and the carrier-etching solution remaining on the first graphene film 113 is cleaned and diluted to facilitate the subsequent surface-treatment process.

Figure 1F:
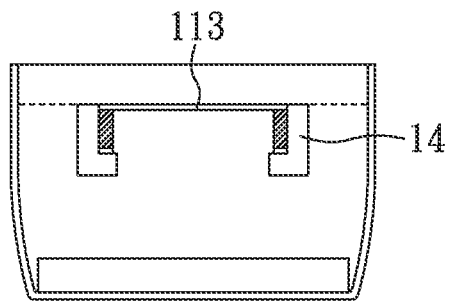

After that, the first graphene film 113 of the etched carrier 11 is dipped in deionized water for several times, and the first graphene film 113 is suspended in the deionized water which serves as a suspension solution, as shown in FIG. 1F. Next, a target substrate 15 is disposed in the suspension solution and aligned to the first graphene film 113 suspending in the suspension solution, and the suspension solution is suctioned out gradually such that the first graphene film 13 gradually approaches the target substrate 15.

Figure 1G:
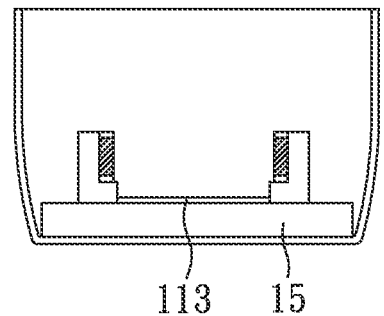
Figure 1H:
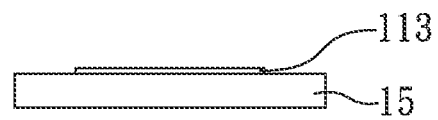

Then, as shown in FIG. 1G, the first graphene film 13 is deposited on the surface of the target substrate 15 as the suspension solution is gradually removed. At this time, the suspension solution may remain between the first graphene film 13 and the target substrate 15, so that the first graphene film 13 and the surface of the target substrate 15 are not adhered with each other completely. Therefore, subjecting the first graphene film 113 adhered with the target substrate 15 may operate to induce the remaining solution to leak out therebetween. Meanwhile, the patterned protection layer 14 which is adhered to the first graphene film 113 and the patterned carrier 11 corresponding thereto are removed, thus completing the object of transferring the first graphene film 113 onto the target substrate 15.

EXAMPLE 2

Figure 2A:
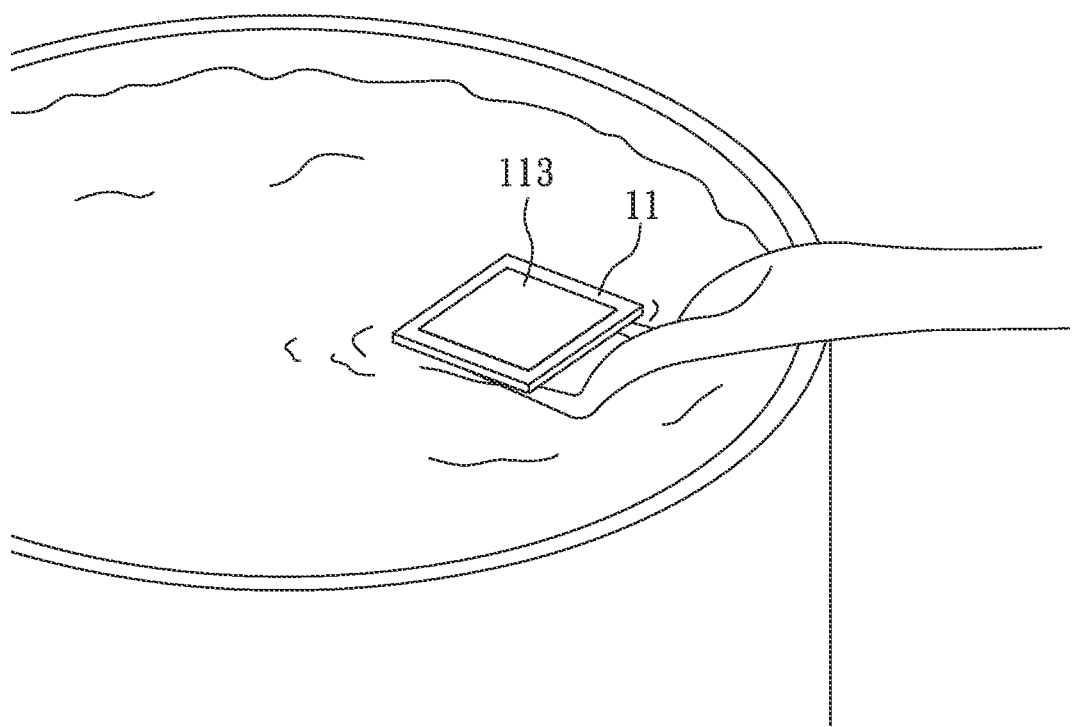
FIGS. 2A to 2B illustrate the schematic cross-sections of the different stages of the process for transferring the graphene film according to Example 2 of the present invention.
Figure 2B:
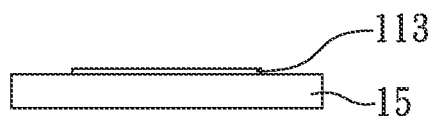
Figure 3A:
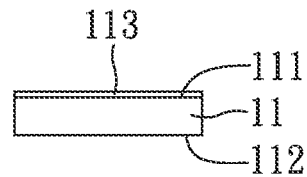
FIGS. 3A to 3D illustrate the schematic cross-sections of the different stages of the process for transferring the graphene film according to Example 4 of the present invention.
Figure 3B:
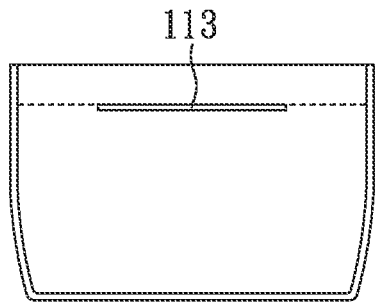
Figure 3C:
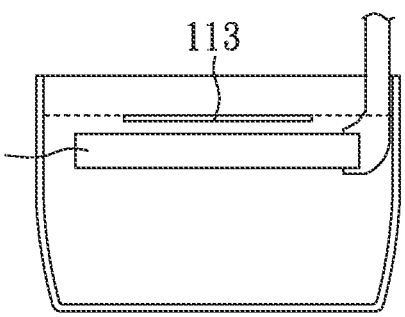
Figure 3D:

In Example 2, the same procedure as in Example 1 is performed except that the first graphene film 113 of the etched carrier 11 is washed by deionized water for several times, and then the first graphene film 113 is suspended in the deionized water which serves as a suspension solution. As shown in FIG. 2A, using the patterned protection layer and the corresponding patterned carrier 11 as origin of force, the first graphene film 113 is lifted up from the suspension solution without touching the first graphene film 113, to transfer the first graphene film 113 onto the target substrate 15. The present method can transfer the first graphene film 113 onto the target substrate 15 more precisely, and the transferring of the first graphene film 113 onto the target substrate 15 is completed, as shown in FIG. 2B.

EXAMPLE 3

As shown in FIGS. 1B and 1C, in this Example, the same procedure as in Example 1 is performed except that before the first graphene film 113 and the carrier 11 are etched, they are washed by a 5% HCl solution for several times to avoid impurities remaining thereon to negatively affect the etching efficiency of the second graphene film 114 and the carrier 11 subsequently.

In addition, as shown in FIG. 1E, the first graphene film 113 is washed by a 5% HCl solution on the first graphene film 113 and the etched carrier 12 to facilitate the surface treatment of the first graphene film.

EXAMPLE 4

The embodiment recited in this example is for the most part identical to the embodiment disclosed in Example 1, with the difference being that the first graphene film 113 is transferred without disposing the patterned protection layer 14.

As shown in FIG. 2A, first, a carrier 11 is provided, wherein the carrier is a copper carrier having a first surface 111 and a second surface 112. The carrier is heated to a temperature of 1000° C. in a mixture of methane and hydrogen, and a thermal chemical vapor deposition of the graphene film on the first surface 111 is performed under a pressure of 1 torr or below, to form the first graphene film 113 on the first surface 111.

As shown in FIG. 2B, the carrier 11 having the first graphene film 113 is dipped in a carrier-etching chemical solution, i.e., 4% $(NH_4)_2S_2O_8$ solution, to etch the carrier 11 and separate the first graphene film 113 from the carrier 11.

Then, the carrier-etching chemical solution suspended with the first graphene film 113 is diluted with deionized water for several times to form a suspension solution in which the first graphene film 113 is suspended. The dilution process of the carrier-etching chemical solution is employed to clean the remaining carrier-etching chemical solution on the first graphene film 113.

Next, as shown in FIGS. 2C and 2D, the target substrate 15 is disposed in the suspension solution and aligned to the first graphene film 113 such that the first graphene film 13 is adhered to the target substrate 15, thus completing the transferring of the first graphene film 113 onto the target substrate 15.

EXAMPLE 5

The embodiment recited in this example is for the most part identical to the embodiment disclosed in Example 4. However, because of the inherent characteristic of the graphene film being transparent, it is more difficult to be studied by naked eyes, the first graphene film is marked by ink such that the first graphene film 113 can be studied by naked eyes after the carrier 11 is etched, to facilitate the alignment between the first graphene film 113 and the target substrate 15.

While the disclosure has described by way of example and in terms of the preferred embodiments, it is to be understood that the disclosure is not limited to the disclosed embodiments. The scope of the appended claims should be accorded the broadest interpretation so as to encompass all such modifications and similar arrangements.

What is claimed is:
1. A method for transferring a graphene film, comprising the following steps:
(A) providing a carrier, wherein the carrier has a first surface and a second surface, and a first graphene film is formed on the first surface of the carrier, wherein the structure of the first graphene film has one or more layers of monolayer graphene;
(B) disposing a patterned protection layer on the second surface of the carrier;
(C) patterning the carrier to expose the first graphene film, wherein the pattern of the patterned protection layer is replicated onto the carrier;
(D) transferring the first graphene film from the pattern carrier onto a target substrate with a suspension solution, wherein the suspension solution is selected from water, alcohol, acetone, or deionized water, and
wherein step (D) for transferring comprises the following steps:
(D1) providing the suspension solution, wherein the target substrate is disposed therein;
(D2) suspending the patterned carrier with the first graphene film in the suspension solution; and

(D3) removing the suspension solution and removing the patterned carrier to transfer the first graphene onto the target substrate.

2. The method for transferring a graphene film of claim 1, wherein the step (D) comprises the following steps:
(D1) providing the suspension solution, and disposing the patterned carrier with the first graphene film in the suspension solution, wherein the patterned carrier suspends on the suspension solution;
(D2) lifting up the patterned carrier to scoop up the first graphene film from the suspension solution; and
(D3) disposing the first graphene film on the target substrate.

3. The method for transferring a graphene film of claim 2, wherein the step (D2) further comprises a step (D2'):
(D2') surface-treating or coating at least one surface of the first graphene film.

4. The method for transferring a graphene film of claim 1, wherein the step (A) further comprises the following steps:
(A1) providing a carrier and a carrier board, wherein a first graphene film and a second graphene film are formed respectively on the first surface and the second surface of the carrier, and a buffer layer is disposed on the surface of the carrier board;
(A2) stacking the carrier on the carrier board, and the buffer layer, the first graphene film, the carrier, and the second graphene film are stacked on the carrier board sequentially;
(A3) removing the second graphene film to expose the second surface of the carrier.

5. The method for transferring a graphene film of claim 4, further comprising a step (A1') after the step (A1): cleaning the first graphene film and the second graphene film.

6. The method for transferring a graphene film of claim 5, wherein the first graphene film and the second graphene film are cleaned with a hydrochloric acid solution.

7. The method for transferring a graphene film of claim 1, further comprising a step (B') after the step (B): cleaning the second surface of the carrier.

8. The method for transferring a graphene film of claim 7, wherein the second surface of the carrier is cleaned with a hydrochloric acid solution.

9. The method for transferring a graphene film of claim 2, wherein the carrier with the first graphene film is disposed in an etching solution for the patterning process of the step (C).

10. The method for transferring a graphene film of claim 9, wherein the etching solution is selected from a group consisting of an ammonium persulfate solution, a ferric chloride solution, a phosphoric acid solution, a sulfuric acid solution, or combinations thereof.

11. The method for transferring a graphene film of claim 1, wherein the patterning process of the step (C) comprises: patterning the carrier and the first graphene film on the patterned protection layer.

12. The method for transferring a graphene film of claim 1, further comprising a step (E) after the step (D): repeating the steps (A)-(D) to form a plurality of graphene films on the target substrate.

13. The method for transferring a graphene film of claim 1, wherein the carrier is selected from the group consisting of copper, nickel, and combinations thereof.

14. The method for transferring a graphene film of claim 4, wherein the buffer layer is selected from the group consisting of paper, dust-free paper, tissue paper, non-woven, and combinations thereof.

15. The method for transferring a graphene film of claim 4, wherein in the step (A3) the second graphene film is removed by an etching process.

16. The method for transferring a graphene film of claim 15, wherein the etching solution for removing the second graphene film is a chemical solution for etching carbon, and the chemical solution is selected from the group consisting of a hydrogen peroxide solution, a nitric acid solution, a potassium hydroxide solution, and combinations thereof.

17. The method for transferring a graphene film of claim 1, wherein in the step (D), the first graphene film being transferred on the target substrate includes portion of its surface to be bare graphene alone.

* * * * *